United States Patent
Wille et al.

(10) Patent No.: US 7,122,610 B2
(45) Date of Patent: Oct. 17, 2006

(54) METHOD OF PRODUCING THERMOPLASTIC FLUOROPOLYMERS USING ALKYL SULFONATE SURFACTANTS

(75) Inventors: Roice Andrus Wille, Malvern, PA (US); Mehdi Durali, West Chester, PA (US); Lotfi Hedhli, King of Prussia, PA (US); Ramin Amin-Sanayei, Collegeville, PA (US); John Schmidhauser, Paoli, PA (US)

(73) Assignee: Arkema Inc., Philadelphia, PA (US)

( * ) Notice: Subject to any disclaimer, the term of this patent is extended or adjusted under 35 U.S.C. 154(b) by 48 days.

(21) Appl. No.: 10/832,535

(22) Filed: Apr. 27, 2004

(65) Prior Publication Data

US 2005/0239983 A1    Oct. 27, 2005

(51) Int. Cl.
*C08F 214/22* (2006.01)

(52) U.S. Cl. .................. 526/255; 526/89; 526/100; 526/242; 526/250

(58) Field of Classification Search .................. 526/89, 526/100, 242, 250, 255
See application file for complete search history.

(56) References Cited

U.S. PATENT DOCUMENTS

| | | | |
|---|---|---|---|
| 2,460,573 A | 2/1949 | Folt | 526/321 |
| 2,723,970 A | 11/1955 | Folt et al. | 526/249 |
| 3,009,892 A | 11/1961 | Duddington et al. | 524/723 |
| 3,249,595 A | 5/1966 | Lederer et al. | 526/91 |
| 4,025,709 A * | 5/1977 | Blaise et al. | 526/225 |
| 4,524,197 A | 6/1985 | Khan | 526/206 |
| 5,629,376 A * | 5/1997 | Sargent et al. | 524/745 |
| 5,763,552 A | 6/1998 | Feiring et al. | 526/214 |
| 5,925,705 A * | 7/1999 | Araki et al. | 524/462 |
| 6,255,384 B1 | 7/2001 | McCarthy et al. | 524/100 |
| 6,365,684 B1 | 4/2002 | McCarthy et al. | 526/81 |
| 6,512,063 B1 | 1/2003 | Tang | 526/225 |
| 6,586,547 B1 * | 7/2003 | Amin-Sanayei et al. | 526/255 |
| 6,602,968 B1 * | 8/2003 | Bekiarian et al. | 526/255 |
| 6,696,067 B1 * | 2/2004 | Brandt et al. | 424/401 |
| 2001/0007889 A1 | 7/2001 | Araki et al. | 524/378 |
| 2003/0114614 A1 * | 6/2003 | Wille et al. | 526/247 |

FOREIGN PATENT DOCUMENTS

| | | |
|---|---|---|
| DE | 828 595 | 1/1952 |
| DE | 1003447 | 2/1957 |
| EP | 816397 A1 * | 1/1998 |
| EP | 1591461 A1 * | 11/2005 |
| GB | 1 509 404 | 5/1978 |

* cited by examiner

*Primary Examiner*—David W. Wu
*Assistant Examiner*—Henry S. Hu
(74) *Attorney, Agent, or Firm*—Thomas F. Roland

(57) ABSTRACT

Nonfluorinated surfactants selected from C7–C20 linear 1-alkanesulfonates, 2-alkanesulfones, and 1,2-alkanedisulfones are particularly effective for stabilizing emulsions in preparing non-elastomeric fluoropolymers containing at least 71 wt % vinylidene fluoride and having at least a 2% crystalline polyvinylidene fluoride content. Processes for making such fluoropolymers using these surfactants, particularly in combination with one or both of a nonionic polymerization initiator and the use of mechanical coagulation to isolate the product, are also provided, as are fluoropolymers made thereby.

24 Claims, No Drawings

METHOD OF PRODUCING THERMOPLASTIC FLUOROPOLYMERS USING ALKYL SULFONATE SURFACTANTS

FIELD OF THE INVENTION

This invention relates to fluoropolymers and their preparation. More particularly, it relates to nonfluorinated surfactants for use in preparing such fluoropolymers.

BACKGROUND OF THE INVENTION

Processes for making fluoropolymers by an emulsion process commonly uses perfluorinated or highly fluorinated surfactants to stabilize the emulsion during the reaction. For example, perfluorocarboxylate salts may be used to stabilize fluoropolymer emulsion polymerizations, with the most common example being ammonium perfluorooctanoate. The high degree of fluorination in the surfactant is thought to prevent or reduce atom transfer between a growing polymer chain and the surfactant during polymerization, which would result in lowered product molecular weight and likely inhibition of the polymerization. Such fluorosurfactants are expensive, specialized materials, however, and because of their high stability, they tend to persist in the environment. Thus nonfluorinated surfactants suitable for making fluoropolymers, and processes using these surfactants, would be beneficial.

SUMMARY OF THE INVENTION

In one aspect, the invention provides a method of making a fluoropolymer. The method comprises:

(a) contacting an aqueous mixture comprising a surfactant and a radical initiator with a monomer feed comprising one or more fluoromonomers;

(b) providing sufficient heat and agitation to effect a polymerization of the one or more fluoromonomers, thereby forming a fluoropolymer dispersion; and (c) isolating the fluoropolymer from the dispersion.

The surfactant comprises an alkanesulfonate selected from C7–C20 linear 1-alkanesulfonates, C7–C20 linear 2-alkanesulfonates, C7–C20 linear 1,2-alkanedisulfonates, and mixtures thereof; and wherein the fluoropolymer is nonelastomeric, comprises at least 71 wt % vinylidene fluoride, and has at least a 2% crystalline polyvinylidene fluoride content.

In another aspect, the invention provides a method of making a fluoropolymer. The method comprises:

(a) contacting an aqueous mixture comprising a surfactant and a radical initiator with a monomer feed comprising one or more fluoromonomers;

(b) providing sufficient heat and agitation to effect a polymerization of the one or more fluoromonomers, thereby forming a fluoropolymer dispersion; and (c) isolating the fluoropolymer from the dispersion.

The surfactant comprises an alkanesulfonate selected from linear 1-octanesulfonates, linear 2-octanesulfonates, linear 1,2-octanedisulfonates, linear 1-decanesulfonates, linear 2-decanesulfonates, linear 1,2-decanedisulfonates, linear 1-dodecanesulfonates, linear 2-dodecanesulfonates, linear 1,2-dodecanedisulfonates and combinations thereof; and wherein the fluoropolymer is nonelastomeric, comprises at least 71 wt % vinylidene fluoride, and has at least a 2% crystalline polyvinylidene fluoride content.

In yet another aspect, the invention provides a fluoropolymer made by a method according to either of the two preceding paragraphs.

DETAILED DESCRIPTION OF THE INVENTION

The invention provides surfactants suitable for use in preparing nonelastomeric fluoropolymers from fluoromonomers. The fluoropolymers are prepared in an aqueous dispersion (typically an emulsion) polymerization reaction mixture that includes one or more surfactants and one or more radical initiators. The surfactants, unlike those typically used in existing fluoropolymer processes, are nonfluorinated. More particularly, they are of a limited range of molecular structures, as will be described in detail below. The invention also provides methods for preparing fluoropolymers, using these surfactants in the process. Optionally, polymerizations to prepare the fluoropolymers may be performed in the presence of chain transfer agents to regulate molecular weight, buffering agents to maintain a desired pH range during the polymerization, and antifoulants to reduce or eliminate adhesion of the polymer to the inside surfaces of the polymerization vessel. Each of these ingredients will be discussed in detail below, as will the conditions under which preparations of the fluoropolymers are conducted.

The term "fluoropolymer" as used for purposes of this invention means a polymeric material comprising at least 71 wt % of vinylidene fluoride units, with the remainder of the units being one or more fluoromonomers, ethene, and/or propene. The fluoropolymer may consist essentially of vinylidene fluoride and optionally other fluoromonomer units, or it may comprise ethene and or propene comonomer units as well. Typically, if ethene and/or propene are included, the fluoropolymer comprises other fluoromonomer units in addition to vinylidene fluoride. Such a fluoropolymer comprising ethene and/or propene units may therefore be a terpolymer or a polymer with four or more types of monomer units. Fluoropolymers made according to this invention typically contain a measurable level of crystalline polyvinylidene fluoride, such as may be indicated by the presence of a crystalline melting point in a differential scanning calorimetry (DSC) experiment. For example, they may have at least a 2% crystalline polyvinylidene fluoride content, and typically at least 5%, while some are 15% or higher, as determined from the enthalpy of melting by DSC according to the method of ASTM E 793-01. The following equation was used to calculate the percent crystallinity from the enthalpy of melting:

% crystalline content=measured enthalpy of melting (in J/g)×(100)/(105 J/g), where 105 J/g is a reported value for the equilibrium enthalpy of melting for polyvinylidene fluoride in its common crystalline form, known as "alpha phase" or "crystal Form II."

The fluoropolymers may be homopolymers, copolymers, terpolymers or polymers derived from more than three monomers. They are typically thermoplastic, where "thermoplastic" means the ability to be formed into shapes by the application of heat and (typically) pressure, such as is done in molding and extrusion processes. Exemplary polymers made by the methods of the invention include polyvinylidene fluoride homopolymer, copolymers, terpolymers and higher polymers having a vinylidene fluoride content of at least 71 wt %, and typically at least 75 wt %. Levels up to about 99 wt % may be found in some exemplary embodiments of the invention. Specific fluoropolymers according to the invention include for example copolymers of vinylidene fluoride with hexafluoropropylene, tetrafluoroethylene, or trifluoroethylene, and terpolymers of vinylidene fluoride with tetrafluoroethylene and hexafluoropropylene or with tetrafluoroethylene and trifluoroethylene. Other copolymers and terpolymers may contain fluoromonomers other than those listed above, in combination with vinylidene fluoride. Suitable examples of such other fluoromonomers for use according to the invention will be detailed further below.

Surfactant

The inventors have found that members of a certain narrow range of surfactants have particular utility in preparing fluoropolymers. The use of these surfactants, which are linear alkanesulfonic and -disulfonic salts within a narrow range of chain length, makes it possible to prepare nonelastomeric fluoropolymers containing a high level of vinylidene fluoride. This is surprising because fluoropolymer preparations are typically performed in the presence of fluorinated surfactants. An important reason why fluorinated surfactants are typically used is their superior ability to stabilize emulsions of fluoromonomers and fluoropolymers, compared with typical nonfluorinated surfactants.

Particularly noteworthy is that surfactants according to the invention are effective in fluoropolymer polymerizations in which the radical initiator comprises no ionic species. This is especially surprising because, while ionic initiators (such as persulfate, for example) tend to produce anionic sites on the fluoropolymer latex particle, aiding in emulsion stabilization, nonionic initiators (such as organic peroxide) do not. The fact that the surfactants of the present invention provide good emulsion stabilization even when used with initiators that do not contribute ionic stabilization to the emulsion is unexpected. Indeed, the particular effectiveness of the surfactants of this invention is highlighted even further by that fact that their use may allow high loadings of fluoromonomer in the polymerization reaction, exceeding 20 wt % of the total reaction mixture. As is well known in the art, emulsions are more difficult to stabilize at higher concentrations. Nonetheless, the surfactants of this invention are able to stabilize such emulsions.

The ability of the surfactants of this invention to stabilize emulsions in the absence of ionic initiators confers an additional benefit, namely that the isolated product has a lower concentration of ionic species, which tend to generate a yellow color when the fluoropolymer is melted and molded or extruded into a useful shape. Additionally, the lower ionic content in the fluoropolymer reduces the electrical conductivity of aqueous extracts of the fluoropolymer, and increases the electrical resistivity of the fluoropolymer, which may be of significant benefit in certain applications. Such applications include, for example, architectural coatings, where the presence of ionic materials causes low resistivity, which can lead to an inability to electrically charge a dispersion sufficiently for correct spray coating onto an architectural substrate. Other applications requiring low ionic levels include water purification membranes and high purity piping for water supplies in the semiconductor industry.

Surfactants according to the invention comprise, or consist essentially of, alkanesulfonates selected from C7–C20 linear 1-alkanesulfonates, C7–C20 linear 2-alkanesulfonates, and C7–C20 linear 1,2-alkanedisulfonates. Combinations of any of these may be used as well. Typically, C8–C12 alkanesulfonates are used. More typically, linear 1-octanesulfonates, linear 2-octanesulfonates, linear 1,2-octanedisulfonates, linear 1-decanesulfonates, linear 2-decanesulfonates, linear 1,2-decanedisulfonates, linear 1-dodecanesulfonates, linear 2-dodecanesulfonates, linear 1,2-dodecanedisulfonates and combinations thereof will be used. Particularly suitable surfactants according to the invention are 1-octanesulfonates, 2-octanesulfonates, 1,2-octanedisulfonates, 1-decanesulfonates, 2-decanesulfonates, 1,2-decanedisulfonates, 1-dodecanesulfonates, 2-dodecanesulfonates, 1,2-dodecanedisulfonates, and mixtures of any of these. As used herein, the term "alkanesulfonate(s)" and terms ending with the term "sulfonate(s)" or "disulfonate(s)," such as those used above, refer to alkali metal, ammonium, or monoalkyl-, dialkyl-, trialkyl-, or tetraalkyl-substituted ammonium salts of alkanesulfonic or alkanedisulfonic acids. The use of ammonium ion as the counterion to the alkanesulfonate ion may provide an especially low level of ionic content in the fluoropolymer product. Sodium, potassium, and ammonium alkanesulfonates, or mixtures of any of these, are typically used.

Fluoromonomer

The term "fluoromonomer" as used according to the invention means a fluorinated and olefinically unsaturated monomer capable of taking part in a free radical polymerization reaction. The fluoromonomers used according to the invention may consist only of vinylidene fluoride, or they may contain any of a wide variety of other fluoromonomers known in the art, in combination with the vinylidene fluoride. Suitable fluoromonomers for use according to the invention include at least one fluorine atom, and may for example incorporate a fluoroalkyl group, a fluoroalkoxy group, or a vinylic fluorine atom.

Suitable exemplary fluoromonomers for use according to the invention include, in addition to vinylidene fluoride, vinyl fluoride, trifluoroethylene, tetrafluoroethylene (TFE), and hexafluoropropylene (HFP). Further exemplary fluoromonomers include, as nonlimiting examples, partly or fully fluorinated alpha-olefins such as 3,3,3-trifluoro-1-propene, 1,2,3,3,3-pentafluoropropene, 3,3,3,4,4-pentafluoro-1-butene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), and partly or fully fluorinated allylic monomers based on, for example, 2-hydroxyethyl allyl ether or 3-allyloxypropanediol.

Radical Initiator

Radical initiators suitable for use according to the invention are compounds, or combinations of compounds (such as redox systems), that are capable of providing a source of free radicals, either spontaneously or by exposure to heat or light. The radical initiator is added to the reaction mixture in an amount sufficient to initiate and maintain the polymerization reaction at a desired reaction rate. The order of addition may vary according to the desired process and latex emulsion characteristics. Suitable nonlimiting classes of initiators include persulfate salts, peroxides, azo compounds, and redox systems, all of which are well known in the art. As used herein, the term "ionic initiator" means a radical initiator that includes at least one salt containing a metal cation and/or an ammonium or substituted ammonium cation. Examples and typical use conditions of the various classes of initiator will now be discussed.

The radical initiator may comprise a persulfate salt, such as sodium persulfate, potassium persulfate, or ammonium persulfate. The amount of persulfate salt added to the reaction mixture (based upon the total weight of monomer added to the reaction mixture) is typically from about 0.005 to about 1.0 wt %.

The radical initiator may comprise an organic peroxide such as an alkyl hydroperoxide, a dialkyl or diacyl peroxide, a peroxydicarbonate, and/or a peroxy ester. One suitable dialkyl peroxide is di-tert-butylperoxide (DTBP), which may be added to the reaction mixture in an amount typically from about 0.01 to about 5 wt % based on total monomer, and more typically from about 0.05 to about 2.5 wt %. Suitable exemplary peroxydicarbonate initiators include di-n-propyl peroxydicarbonate and diisopropyl peroxydicarbonate, which are typically added to the reaction mixture in an amount from about 0.5 to about 2.5 wt % based on total monomer. Suitable exemplary peroxy ester initiators include tert-amyl peroxypivalate, tert-butyl peroxypivalate, and succinic acid peroxide.

The radical initiator may comprise an azo initiator, with one suitable example being 2,2'-azobis(2-methylpropionamidine) dihydrochloride.

The radical initiator may comprise a redox system. By "redox system" is meant a system comprising an oxidizing agent, a reducing agent, and optionally a promoter that acts as an electron transfer medium. The promoter is a component that, in different oxidation states, is capable of reacting with both the oxidant and the reducing agent, thereby accelerating the overall reaction. Oxidizing agents include, for example, persulfate salts; peroxides, such as hydrogen peroxide; hydroperoxides such as tert-butyl hydroperoxide and cumene hydroperoxide; and oxidizing metal salts such as, for example, ferric sulfate. Exemplary reducing agents include sodium formaldehyde sulfoxylate; sodium or potassium sulfite, bisulfite, or metabisulfite; ascorbic acid; and reduced metal salts. Typical promoters include transition metal salts such as ferrous sulfate. In redox systems, the oxidizing agent and the reducing agent are typically utilized in an amount from about 0.01 to about 0.5 wt % based on total monomer. The promoter, if used, is typically employed in an amount from about 0.005 to about 0.025 wt % based on total monomer.

The radical initiator may comprise a combination of an ionic initiator, such as a persulfate salt, with an organic peroxide selected from the group consisting of alkyl hydroperoxides, dialkyl peroxides, diacyl peroxides, peroxydicarbonates, peroxy esters, and combinations of any of these.

Especially useful peroxides for use in such combined initiators include di-tert-butyl peroxide, diisopropyl peroxydicarbonate, and di-n-propyl peroxydicarbonate.

Chain Transfer Agent

Chain-transfer agents may be added to the polymerization mixture to regulate the molecular weight of the product. They may be added in a single portion at the beginning of the reaction, or incrementally or continuously throughout the reaction. The amount and mode of addition of chain-transfer agent, if any, depend on the activity of the particular agent employed, and on the desired molecular weight of the polymer product. The amount of chain-transfer agent added to the polymerization reaction is typically from about 0.05 to about 5 wt %, more typically from about 0.1 to about 2 wt %, based on the total weight of monomer in the reaction mixture. Oxygenated compounds such as alcohols, carbonates, ketones, esters, and ethers may serve as chain-transfer agents. Examples of suitable oxygenated compounds useful as chain-transfer agents according to the invention include isopropyl alcohol, acetone, ethyl acetate, and diethyl carbonate. Other classes of suitable chain-transfer agents include, for example, halocarbons and hydrohalocarbons, such as chlorocarbons, hydrochlorocarbons, chlorofluorocarbons and hydrochlorofluorocarbons. Particular nonlimiting examples include trichlorofluoromethane and 1,1-dichloro-2,2,2-trifluoroethane. In addition, ethane and propane may be used as chain-transfer agents according to the invention.

Buffering Agent

The polymerization reaction mixture may optionally contain a buffering agent to maintain a controlled pH throughout the polymerization reaction. The pH is typically controlled within the range of from about 4 to about 8, to minimize undesirable color development in the product.

Buffering agents may comprise an organic or inorganic acid or an alkali metal salt thereof, or base or salt of such organic or inorganic acid, that has at least one pKa value and/or pKb value in the range of from about 4 to about 10, usually from about 4.5 to about 9.5. Suitable exemplary buffering agents for use according to the invention include phosphate buffers and acetate buffers, such as are well known in the art.

Buffering agents are especially useful when a persulfate salt (e.g. potassium persulfate) is employed as the radical initiator. A preferred buffering agent in such a situation is sodium acetate. A preferred amount of sodium acetate buffer is from about 50 wt % to about 150 wt %, based on the weight of persulfate initiator added to the reaction. In one typical embodiment, the initiator feed comprises approximately equal weights of potassium persulfate and sodium acetate in aqueous solution.

Antifoulant

The optional addition of an antifoulant such as paraffin wax or hydrocarbon oil to the reaction mixture is typically performed to minimize or prevent adhesion of fluoropolymer to the reactor components. Any long chain saturated hydrocarbon wax or oil can perform this function. The oil or wax is added to the reactor prior to formation of fluoropolymer, in an amount sufficient to minimize the formation of polymer adhesions to the reactor components. This amount is generally proportional to the interior surface area of the reactor, and on a relative basis may vary from about 1 to about 40 mg/cm$^2$ of reactor interior surface area. If a paraffin wax or hydrocarbon oil is used as the antifoulant, the amount used is typically about 5 mg/cm$^2$ of the reactor interior surface area.

Polymerization Process

Preparation of fluoropolymers according to the invention is typically performed in a pressurized reactor equipped with an efficient agitation system, using equipment known in the art. The pressure used for polymerization may be selected from a wide range of pressures, from about 280 to about 20,000 kPa, depending on the capabilities of the reaction equipment, the initiator system chosen, and the monomer composition used. The polymerization pressure is typically from about 2,000 to about 11,000 kPa, and most typically from about 2,750 to about 6,900 kPa. The polymerization temperature may vary from about 20° C. to about 160° C., depending on the initiator system chosen, and is typically from about 35° C. to about 130° C., and most typically from about 65° C. to about 95° C.

Product Isolation

The product of the polymerization is a fluoropolymer latex that can be used in that form, usually after filtration of solid byproducts such as coagulate waste polymer from the polymerization process. For use in latex form, the latex may be stabilized by the addition of an additional surfactant, which may be an ionic surfactant either the same as or different from that used in the polymerization, or it may be a nonionic surfactant. Alternatively the latex emulsion may be coagulated to isolate the solid fluoropolymer, which may then be washed and dried. Coagulation may be performed by the addition of salts or acids, with the fluoropolymer being isolated by well-known means such as by filtration. Alternatively, a mechanical coagulation may be performed, using for example a high-shear mixer. The inventors have found that mechanical coagulation, in the absence of salts or other ionic materials added as coagulants, is of considerable help in producing a fluoropolymer that is resistant to yellowing upon melt-processing, for example when forming a part. The inventors have also found that such coagulation provides a fluoropolymer exhibiting a low level of conductivity, as measured on an aqueous extract of the product, and a high electrical resistivity. Such product also may exhibit less yellowing upon molding or extruding. A particularly effective way of achieving these benefits is to mechanically coagulate a fluoropolymer product that has been prepared using the surfactants of this invention in combination with a nonionic initiator, as discussed above. Once isolated, the solid fluoropolymer may be purified by washing or by other means, and it may be dried for use as a powder, which may in turn be further processed into granules.

EXAMPLES

The following examples are provided to illustrate the practice of the invention, and are not to be construed as limiting the scope of the claims. In the examples, unless otherwise noted, deionized water and ACS reagent grade ingredients were used.

Example 1

Vinylidene fluoride homopolymer was prepared, using sodium 1-octanesulfonate surfactant and di-tert-butyl peroxide initiator, as follows. To a 7.5 liter, stainless steel reactor was added 4.330 kg of water, 0.004 kg of paraffin wax, 0.1000 kg of an aqueous surfactant solution consisting of 0.00264 kg of sodium 1-octanesulfonate (98 wt % activity) and 0.09736 kg water. The mixture was purged with argon and agitated for 0.5 hours. The reactor was sealed, agitation was continued, and the reactor was heated to 120° C. The reactor was charged with 0.370 kg of vinylidene fluoride and 0.017 kg of di-tert-butyl peroxide. The reactor temperature stabilized at 121° C., with the reactor pressure at 4611 kPa. The reaction temperature was held at 121° C., and the reaction pressure was maintained at 4480 kPa by adding vinylidene fluoride as needed. After 3.5 hours, the feed of vinylidene fluoride was stopped. During this period 1.648 kg vinylidene fluoride had been added to the reactor. For a period of 0.5 hours, agitation was continued and the temperature was maintained. The agitation and heating were discontinued. After cooling to room temperature, surplus gas was vented, and the reactor was emptied of latex through a stainless steel mesh. Gravimetric solids measurements of the latex showed the solid polymer yield to be 81 wt % based on the total weight of the vinylidene fluoride fed to the reactor.

Example 2

A vinylidene fluoride/HFP copolymer was prepared, using a mixture of sodium 1-octanesulfonate and sodium 1,2-octanedisulfonate of 93 wt % activity as surfactants and potassium persulfate as initiator, as follows. To a 7.5 liter, stainless steel reactor was added 3.750 kg of water, 0.004 kg of paraffin wax, 0.3000 kg of an aqueous surfactant solution consisting of 0.000677 kg of mixed sodium octanesulfonates and 0.2993 kg water, and 0.1500 kg of an aqueous initiator solution 1.00 wt % in potassium persulfate and 0.90 wt % in sodium acetate. The mixture was purged with argon and agitated for 0.5 hours. The reactor was sealed, agitation was continued, and the reactor was heated to 80° C. The reactor was charged with 0.420 kg of vinylidene fluoride, 0.060 kg hexafluoropropylene, and 18.0 g of an aqueous solution 5.00 wt % in isopropyl alcohol. The reactor temperature stabilized at 82° C., with the reactor pressure at 4510 kPa. A steady feed of the aqueous initiator solution was begun at a rate of about 0.075 kg/h, and it was continued throughout the reaction. The reaction temperature was held at 82° C., and the reaction pressure was maintained at 4480 kPa by adding as needed vinylidene fluoride, hexafluoropropylene, and 5.00 wt % aqueous isopropyl alcohol solution in a ratio of about 1/0.15/0.045, respectively. After 1.55 hours, the feeds of vinylidene fluoride, hexafluoropropylene, and 5.00 wt % isopropyl alcohol solution were stopped. At this point, the following amounts of materials had been added to the reactor: 1.914 kg of vinylidene fluoride, 0.276 kg of hexafluoropropylene, and 0.285 kg of 5.00 wt % isopropyl alcohol solution. For a period of 0.35 hours, agitation was continued, the temperature was maintained, and the feed of aqueous initiator solution was continued. The feed of aqueous initiator was stopped, and then for a period of 0.17 hours, agitation and the reaction temperature were maintained. The agitation and heating were discontinued. After cooling to room temperature, surplus gas was vented, and the reactor was emptied of latex through a stainless steel mesh. Negligible coagulum had formed during the reaction. Gravimetric solids measurements of the latex showed the solid polymer yield to be 98 wt % based on the total combined weight of the vinylidene fluoride and hexafluoropropylene monomers which were fed to the reactor. The amount of potassium persulfate which was used to convert the monomers to polymer was 0.13 wt %, based on the combined weight of vinylidene fluoride and hexafluoropropylene monomers.

Example 3

A vinylidene fluoride/HFP copolymer was prepared, using an organic initiator and isolation by mechanical shear with a high-shear mixer to coagulate the latex, as follows. Sodium 1-octanesulfonate monohydrate was of ≧99 wt % purity, and sodium 1-decanesulfonate and di-tert-butyl peroxide were both of 98 wt % purity.

Initiator Emulsion: An initiator emulsion was prepared by homogenizing 0.3000 kg of a previously prepared and chilled aqueous solution 0.500 wt % in sodium 1-decanesulfonate, 0.6800 kg of chilled water, and 0.0200 kg of frozen diisopropyl peroxydicarbonate. The emulsion was kept at 5–10° C. until delivery to the reactor.

Reaction: To a 7.5 liter, stainless steel reactor was added 4.180 kg of water, 0.004 kg of paraffin wax, 0.1000 kg of an aqueous surfactant solution 5.00 wt % in sodium 1-octanesulfonate monohydrate, and 0.1850 kg of another aqueous surfactant solution 0.500 wt % in sodium 1-decanesulfonate. The mixture was purged with argon and agitated for 0.5 hours. The reactor was sealed, agitation was continued, and the reactor was heated to 82° C. The reactor was charged with 0.358 kg of vinylidene fluoride and 0.052 kg of hexafluoropropylene to reach a pressure of 4590 kPa. Initiator emulsion, 0.100 kg, was charged to the reactor over a period of 0.28 hour, and then the rate of addition was reduced to about 0.0600 kg/hour and continued throughout the reaction. With polymerization initiation, the reactor pressure dropped to 4480 kPa, and it was maintained there by the addition, as needed, of a mixture of vinylidene fluoride and hexafluoropropylene in a ratio of about 1/0.135. The reaction temperature was maintained at 82° C. during the reaction. After 1.7 hours from the time the charge of initiator emulsion was begun, the feeds of vinylidene fluoride and hexafluoropropylene were stopped. At this point, 1.226 kg of vinylidene fluoride and 0.166 kg of hexafluoropropylene had been added to the reactor. For a period of 0.33 hours, agitation was continued, the temperature was maintained, and the feed of initiator emulsion was continued. The feed of initiator emulsion was then stopped, and for a period of 0.17 hours, agitation and the reaction temperature were maintained. The agitation and heating were discontinued. After cooling to room temperature, surplus gas was vented, and the reactor was emptied of latex through a stainless steel mesh. The pH of the latex was 4. The latex was coagulated using mechanical shear, the coagulated solid was washed with water in a column using countercurrent flow, and then the dry solid was obtained by removing water in a spray dryer.

Example 4

A vinylidene fluoride/HFP copolymer was prepared, using an ionic initiator with buffer, and isolated by using salt solution to coagulate the latex, as follows. Sodium 1-octanesulfonate monohydrate was of ≧99 wt % purity, and sodium 1-decanesulfonate was of 98 wt % purity.

Initiator Solution: An initiator solution was prepared by mixing 0.006331 kg of ammonium persulfate, 0.3000 kg of an aqueous solution 0.500 wt % in sodium 1-decanesulfonate, and 0.6937 kg of water.

Reaction: To a 7.5 liter, stainless steel reactor was added 4.080 kg of water, 0.1000 of an aqueous buffer solution 11.82 wt % in dibasic sodium hydrogen phosphate, 0.1000 kg of an aqueous surfactant solution 5.00 wt % in sodium 1-octanesulfonate monohydrate, and 0.1850 kg of another aqueous surfactant solution 0.500 wt % in sodium 1-decanesulfonate. The mixture was purged with argon and agitated for 0.5 hours. The reactor was sealed, agitation was continued, and the reactor was heated to 84° C. The reactor was charged with 0.334 kg of vinylidene fluoride and 0.048 kg of hexafluoropropylene to reach a pressure of 4530 kPa. Initiator solution, 0.100 kg, was charged to the reactor over a period of 0.27 hour, and then the rate of addition was reduced to about 0.0600 kg/hour and continued throughout the reaction. With polymerization initiation, the reactor pressure dropped to 4480 kPa, and it was maintained there by the addition, as needed, of a mixture of vinylidene fluoride and hexafluoropropylene in a ratio of about 1/0.135. The reaction temperature was maintained at 82° C. during the reaction. After 2.3 hours from the time the charge of initiator solution was begun, the feeds of vinylidene fluoride and hexafluoropropylene were stopped. At this point, 1.244 kg of vinylidene fluoride and 0.168 kg of hexafluoropropylene had been added to the reactor. For a period of 0.33 hours, agitation was continued, the temperature was maintained, and the feed of initiator solution was continued. The feed of initiator solution was then stopped, and for a period of 0.17 hours, agitation and the reaction temperature were maintained. The agitation and heating were discontinued. After cooling to room temperature, surplus gas was vented, and the reactor was emptied of latex. The pH of the latex was 7. The latex was coagulated by the addition of magnesium sulfate solution. The polymer was allowed to settle, and the aqueous phase was removed. The polymer was given 4 slurry washes with water, filtered, and dried for 64 hours in an oven held at 110° C.

Example 5

A vinylidene fluoride homopolymer was prepared, using an organic initiator and isolated by mechanical shear to coagulate the latex, as follows.

To a 7.5 liter, stainless steel reactor was added 4.330 kg of water, 0.004 kg of paraffin wax, and 0.1000 kg of an aqueous surfactant solution 5.817 wt % in sodium 1-octanesulfonate monohydrate. The mixture was purged with argon and agitated for 0.5 hours. The reactor was sealed, agitation was continued, and the reactor was heated to 122° C. The reactor was charged with 0.258 kg of vinylidene fluoride to pressure of 4500 kPa. Di-tert-butyl peroxide initiator, 0.0174 kg, was charged to the reactor over a period of 0.1 hour. The reactor temperature was stabilized and held at 121° C., and after initiation of the reaction, the reactor pressure was maintained at 4480 kPa by adding as needed, vinylidene fluoride. After 4.9 hours from the time the charge of initiator was begun, the feed of vinylidene fluoride was stopped. A total of 1.348 kg of vinylidene fluoride had been added to the reactor. For a period of 0.5 hours, agitation was continued and the temperature was maintained. The agitation and heating were discontinued. After cooling to room temperature, surplus gas was vented, and the reactor was emptied of latex through a stainless steel mesh. The latex was coagulated using mechanical shear, the coagulated solid was washed with water in a column using countercurrent flow, and then the dry solid was obtained by removing water in a spray dryer.

Example 6

A vinylidene fluoride homopolymer was prepared, using an ionic initiator with buffer, and isolated by using salt solution to coagulate the latex, as follows.

Initiator Solution: An aqueous initiator solution was prepared that was 0.7035 wt % in ammonium persulfate.

Reaction: To a 7.5 liter, stainless steel reactor was added 4.230 kg of water, 0.1000 of an aqueous buffer solution 11.73 wt % in dibasic sodium hydrogen phosphate, and 0.1000 kg of an aqueous surfactant solution 5.817 wt % in sodium 1-octanesulfonate monohydrate. The mixture was purged with argon and agitated for 0.5 hours. The reactor was sealed, agitation was continued, and the reactor was heated to 123° C. The reactor was charged with 0.250 kg of vinylidene fluoride to pressure of 4560 kPa. Initiator solution, 0.0300 kg, was charged to the reactor over a period of 0.23 hour, and then the rate of addition was reduced to about 0.0600 kg/hour and continued throughout the reaction. The reactor temperature was stabilized and held at 121° C., and after initiation of the reaction, the reactor pressure was maintained at 4480 kPa by adding as needed, vinylidene fluoride. After 2.6 hours from the time the charge of initiator solution was begun, the feed of vinylidene fluoride was stopped. A total of 1.396 kg of vinylidene fluoride had been added to the reactor. For a period of 0.37 hours, agitation was continued, the temperature was maintained, and the feed of initiator solution was continued. The feed of initiator solution was then stopped, and for a period of 0.2 hours, agitation and the reaction temperature were maintained. The agitation and heating were discontinued. After cooling to room temperature, surplus gas was vented, and the reactor was emptied of latex. The latex was coagulated by the addition of magnesium sulfate solution. The polymer was allowed to settle, and the aqueous phase was removed. The polymer was given 4 slurry washes with water, filtered, and dried for 63 hours in an oven held at 110° C.

Analysis and Testing

The fluoropolymers prepared in the above examples were evaluated in regard to several performance criteria, as follows.

The crystallinity of the materials was indicated by measurements of the enthalpy of melting using Differential Scanning Calorimetry (DSC) according to the method of ASTM E 793-01. The results are shown in Table I.

TABLE I

Enthalpy of Melting of Powders by DSC

| Identifier | Enthalpy of Melting. J/g | % Crystallinity |
|---|---|---|
| Vinylidene fluoride/HFP Copolymers | | |
| example 3 | 42.0 | 40 |
| example 4 | 37.6 | 36 |
| Vinylidene Fluoride Homopolymers | | |
| example 5 | 47.5 | 45 |
| example 6 | 47.9 | 46 |

All of the fluoropolymer examples in Table I had crystalline polyvinylidene fluoride contents between 36 and 40%, calculated by the method described herein above, and thus all were semicrystalline rather than amorphous.

The yellowness index values of the materials were measured as follows.

Molding of Plaques. The powders were compression molded into plaques using a rectangular, stainless steel, picture-frame mold of nominal 4×2⅛×1/16 inches interior dimension. The mold was sandwiched between Kapton® release sheets and stainless steel plates, and placed in a hot press held at 232° C. The time-pressure profile used in the hot press was 5.0 minutes at <10 psi, 3.0 minutes at 50 psi, and 2.0 minutes at 500 psi. The sandwich was moved to a cold press held at 30° C., and given a time-pressure profile of 6.0 minutes at 600 psi. The plaques were removed from the mold and measured for yellowness and thickness. Duplicates were made of each material and labeled A and B.

Yellowness-C and Thickness Measurements. The plaques were measured for yellowness index with a colorimeter in transmittance mode according to method ASTM E 313. Measurements were taken at three different spots on each plaque, and the results were averaged. The plaques were measured for thickness using a Mitutoyo CD-S8"CT Series No. 500 Caliper. Thickness measurements were taken at three different spots, and the results were averaged. Results are shown in Table II.

TABLE II

Yellowness-C of Molded Plaques

| Identifier | Average Plaque Yellowness-C | Average Plaque Thickness, cm |
|---|---|---|
| Vinylidene fluoride/HFP Copolymers | | |
| example 3, plaque A | 14 | 0.163 |
| example 3, plaque B | 14 | 0.166 |
| example 4, plaque A | 58 | 0.206 |
| example 4, plaque B | 51 | 0.193 |
| Vinylidene fluoride homopolymer | | |
| example 5, plaque A | 19 | 0.179 |
| example 5, plaque B | 17 | 0.181 |
| example 6, plaque A | 80 | 0.196 |
| example 6, plaque B | 81 | 0.194 |

As can be seen from the data of Table II, vinylidene fluoride/HFP copolymer and vinylidene fluoride homopolymer from examples 3 and 5, respectively, which used a nonionic initiator and which were mechanically coagulated, suffered far less yellowing than did analogous polymers from examples 4 and 6, which used an ionic initiator (persulfate) and which were coagulated by addition of a salt (magnesium sulfate).

The powdered products of the above examples were measured for extractable ions and their effects via conductivity and resistivity measurements, as follows.

Conductivity measurements were performed on the products of examples 3 and 4 in powder form. The conductivity imparted to deionized water by the powder of each of examples 3 and 4 was measured as follows. In polyethylene jars, powder, 20.0 g was brought to 200.0 g total mass with deionized water. Controls of deionized water without powder were also prepared. Duplicates were made of each material and labeled A and B. The jars were sealed with polyethylene caps, and they were shaken in a paint mixer for 1.0 hour. After shaking, the jars were allowed to stand quietly overnight. The liquids were separated from the solids by drawing the liquids up a PTFE tube through glass microfiber filters (Whatman ZC GF/D filter) into a polypropylene syringe. The liquids were transferred into additional polyethylene jars, and the conductivity of the liquids were measured with a conductivity meter. The results are shown in Table III.

TABLE III

Conductivity of Aqueous Extracts of vinylidene fluoride/HFP Copolymer Powders

| Identifier | Conductivity, microsiemens/cm |
|---|---|
| example 3, jar A | 2.16 |
| example 3, jar B | 3.16 |
| example 4, jar A | 792 |
| example 4, jar B | 808 |
| water control A | 0.99 |
| water control B | 0.92 |

As can be seen from the data of Table III, vinylidene fluoride/HFP copolymer from example 3, which used a nonionic initiator and which was mechanically coagulated, imparted a far lower conductivity to the water than did copolymer from example 4, which used an ionic initiator (persulfate) and which was coagulated by addition of a salt (magnesium sulfate).

Electrical resistivity was determined for the product of examples 6 and 5 in powder form. A high resistivity is desirable in electrostatic spray coating applications, and the performance of the powders was tested as follows. The resistivity imparted to dispersions of the powder of each of examples 5 and 6 in isophorone dispersant was measured using a Ransburg paint resistance measurement apparatus. Before making the measurement, the powders were ground and dispersed in the isophorone at a 40 wt % solids level using a Cowles' blade to a Hegman value of about 7.7. The nature of the washing and drying process for example 6 made the grinding more difficult than for example 5. The resistivity of the dispersions after grinding was measured with the Ransburg apparatus. The results are shown in Table IV.

TABLE IV

Resistivity of Dispersions of
Polyvinylidene Powders in Isophorone

| Identifier | Resistivity, kohm |
|---|---|
| example 5 | 18 |
| example 6 | 7 |

As can be seen from the data of Table IV, vinylidene fluoride homopolymer from example 5, which used a non-ionic initiator and which was mechanically coagulated, showed far higher resistivity than did homopolymer from example 6, which used an ionic initiator (persulfate) and which was coagulated by addition of a salt (magnesium sulfate).

Although the invention is illustrated and described herein with reference to specific embodiments, the invention is not intended to be limited to the details shown. Rather, it is intended that the scope of the claims that follow should be construed to include such other embodiments as may be devised but which are nevertheless within the true spirit and scope hereof.

We claim:

1. A method of making a fluoropolymer, the method comprising:
   (a) contacting an aqueous mixture comprising a surfactant and a radical initiator with a monomer feed comprising one or more fluoromonomers;
   (b) providing sufficient heat and agitation to effect a polymerization of said one or more fluoromonomers, thereby forming a fluoropolymer dispersion; and
   (c) isolating the fluoropolymer from the dispersion;
wherein the surfactant comprises a non-fluorinated alkanesulfonate selected from C7–C20 linear 1-alkanesulfonates, C7–C20 linear 2-alkanesulfonates, C7–C20 linear 1,2-alkanedisulfonates, and mixtures thereof; and wherein the fluoropolymer is nonelastomeric, comprises at least 71 wt % vinylidene fluoride, and has at least a 2% crystalline polyvinylidene fluoride content.

2. The method of claim 1, wherein the alkanesulfonate is selected from C8–C12 linear 1-alkanesulfonates, C8–C12 linear 2-alkanesulfonates, C8–C12 linear 1,2-alkanedisulfonates, and mixtures thereof.

3. The method of claim 1, wherein the fluoropolymer has at least a 5% crystalline polyvinylidene fluoride content.

4. The method of claim 1, wherein the alkanesulfonate is a sodium, potassium, or ammonium alkanesulfonate, or a mixture thereof.

5. The method of claim 1, wherein the fluoropolymer consists essentially of vinylidene fluoride units and hexafluoropropylene units.

6. The method of claim 1, wherein the fluoropolymer comprises at least 75 wt % vinylidene fluoride.

7. The method of claim 1, wherein the radical initiator comprises no ionic species.

8. The method of claim 1, wherein the radical initiator comprises no ionic species and is selected from the group consisting of alkyl hydroperoxides, dialkyl peroxides, diacyl peroxides, peroxydicarbonates, peroxy esters, and combinations of any of these.

9. The method of claim 1, wherein the radical initiator is selected from the group consisting of di-tert-butyl peroxide, diisopropyl peroxydicarbonate, and di-n-propyl peroxydicarbonate.

10. The method of claim 1, wherein the radical initiator comprises an ionic initiator and an organic peroxide selected from the group consisting of alkyl hydroperoxides, dialkyl peroxides, diacyl peroxides, peroxydicarbonates, peroxy esters, and combinations of any of these.

11. The method of claim 1, wherein the radical initiator comprises a persulfate salt and a compound selected from the group consisting of di-tert-butyl peroxide, diisopropyl peroxydicarbonate, and di-n-propyl peroxydicarbonate.

12. The method of claim 1, wherein the radical initiator is an azo initiator comprising no ionic species.

13. The method of claim 1, wherein the fluoropolymer constitutes, after step (b) but before step (c), at least 20 wt % of the fluoropolymer dispersion.

14. The method of claim 1, wherein step (c) further comprises mechanical coagulation of the fluoropolymer in the absence of any salts added after completion of step (b).

15. The method of claim 1, further comprising, before step (b), adding a wax to the aqueous mixture.

16. The method of claim 1, wherein the alkanesulfonate is an ammonium sodium or potassium alkanesulfonate or a mixture thereof, wherein the radical initiator comprises no ionic species, wherein step (c) comprises mechanical coagulation of the fluoropolymer in the absence of any salts added after completion of step (b), the method further comprising, before step (b), adding a wax to the aqueous mixture.

17. The method of claim 1, wherein the alkanesulfonate is a ammonium, sodium or potassium alkanesulfonate or a mixture thereof, wherein the radical initiator comprises an ionic initiator and an organic peroxide, wherein step (c) comprises mechanical coagulation of the fluoropolymer in the absence of any salts added after completion of step (b), the method further comprising, before step (b), adding a wax to the aqueous mixture.

18. A method of making a fluoropolymer, the method comprising:
   (a) contacting an aqueous mixture comprising a surfactant and a radical initiator with a monomer feed comprising one or more fluoromonomers;
   (b) providing sufficient heat and agitation to effect a polymerization of said one or more fluoromonomers, thereby forming a fluoropolymer dispersion; and
   (c) isolating the fluoropolymer from the dispersion;
wherein the surfactant comprises a non-fluorinated alkanesulfonate selected from linear 1-octanesulfonates, linear 2-octanesulfonates, linear 1,2-octanedisulfonates, linear 1-decanesulfonates, linear 2-decanesulfonates, linear 1,2-decanedisulfonates, linear 1-dodecanesulfonates, linear 2-dodecanesulfonates, linear 1,2-dodecanedisulfonates, and combinations thereof; and wherein the fluoropolymer is nonelastomeric, comprises at least 71 wt % vinylidene fluoride, and has at least a 2% crystalline polyvinylidene fluoride content.

19. The method of claim 18, wherein the alkanesulfonate comprises a 1-octanesulfonate.

20. The method of claim 18, wherein the alkanesulfonate comprises a 1,2-octanedisulfonate.

21. The method of claim 18, wherein the alkanesulfonate comprises a 1-decanesulfonate.

22. The method of claim 18, wherein the fluoropolymer has at least a 5% crystalline polyvinylidene fluoride content.

23. A fluoropolymer made by a method comprising:
(a) contacting an aqueous mixture comprising a surfactant and a radical initiator with a monomer feed comprising one or more fluoromonomers;
(b) providing sufficient heat and agitation to effect a polymerization of said one or more fluoromonomers, thereby forming a fluoropolymer dispersion; and
(c) isolating the fluoropolymer from the dispersion;

wherein the surfactant comprises a non-fluorinated alkanesulfonate selected from C7–C20 linear 1-alkanesulfonates, C7–C20 linear 2-alkanesulfonates, C7–C20 linear 1,2-alkanedisulfonates, and mixtures thereof; and wherein the fluoropolymer is nonelastomeric, comprises at least 71 wt % vinylidene fluoride, and has at least a 2% crystalline polyvinylidene fluoride content.

24. The fluoropolymer of claim 23, wherein the alkanesulfonate is selected from C8–C12 linear 1-alkanesulfonates, C8–C12 linear 2-alkanesulfonates, C8–C12 linear 1,2-alkanedisulfonates, and mixtures thereof.

* * * * *